(12) United States Patent
Yu et al.

(10) Patent No.: US 12,385,859 B2
(45) Date of Patent: Aug. 12, 2025

(54) ELECTRON PTYCHOGRAPHY METHOD AND APPARATUS FOR AUTOMATICALLY CORRECTING MISTILT OF ZONE AXIS OF SAMPLE

(71) Applicant: TSINGHUA UNIVERSITY, Beijing (CN)

(72) Inventors: Rong Yu, Beijing (CN); Hao-Zhi Sha, Beijing (CN); Ji-Zhe Cui, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 199 days.

(21) Appl. No.: 18/244,321

(22) Filed: Sep. 11, 2023

(65) Prior Publication Data

US 2023/0417690 A1 Dec. 28, 2023

Related U.S. Application Data

(63) Continuation of application No. PCT/CN2022/110146, filed on Aug. 4, 2022.

(30) Foreign Application Priority Data

Aug. 6, 2021 (CN) .......................... 202110900738.3
Aug. 10, 2021 (CN) .......................... 202110914428.7

(51) Int. Cl.
G01N 23/00 (2006.01)
G01N 23/2055 (2018.01)

(52) U.S. Cl.
CPC ................................ *G01N 23/2055* (2013.01)

(58) Field of Classification Search
CPC .................................................. G01N 23/2055
See application file for complete search history.

(56) References Cited

U.S. PATENT DOCUMENTS 7,978,346 B1    7/2011   Riza
10,446,366 B1  10/2019   Lazic et al.
(Continued)

FOREIGN PATENT DOCUMENTS

CN    104081292 A    10/2014
CN    107796837 A     3/2018
(Continued)

OTHER PUBLICATIONS

International Search Report of PCT/CN2022/110146.
(Continued)

*Primary Examiner* — Dani Fox

(57) ABSTRACT

An electron ptychography method and an electron ptychography apparatus for automatically correcting a mistilt of a zone axis of a sample. The method includes: acquiring a diffraction pattern of each scan point of the sample by scanning the sample through using an electron beam; initializing an object function and an electron beam function, constructing a forward propagation model according to a propagation function between sample slices, and calculating a loss function to be a difference between a calculated diffraction pattern and the acquired diffraction pattern, where the calculated diffraction pattern is obtained from the forward propagation model and parameters to be optimized; calculating gradients of the loss function with respect to parameters to be optimized respectively, and optimizing the parameters to be optimized according to the gradients; executing the calculating the loss function of the forward propagation model, the calculating the gradients of the loss function with respect to the parameters to be optimized respectively, and the optimizing the parameters to be optimized according to the gradients, iteratively, till a termination condition for iterations is satisfied; and outputting the optimized parameters.

13 Claims, 12 Drawing Sheets

(56) References Cited

U.S. PATENT DOCUMENTS

2015/0022526 A1    1/2015  Christmas
2019/0107781 A1*   4/2019  Tinnemans ......... G03F 7/70633
2020/0135427 A1*   4/2020  Vystavel ............... H01J 37/304

FOREIGN PATENT DOCUMENTS

| CN | 110687142 A    | 1/2020  |
| CN | 111179371 A    | 5/2020  |
| CN | 113720865 A    | 11/2021 |
| EP | 3230784 A1     | 10/2017 |
| EP | 3835768 A1     | 6/2021  |
| NO | 20031631       | 4/2003  |
| WO | WO2016019324 A2 | 2/2016 |
| WO | WO2016092161 A1 | 6/2016 |
| WO | WO2018102792 A1 | 6/2018 |
| WO | WO2019072101 A1 | 4/2019 |

OTHER PUBLICATIONS

Pan, An et al. Experimental study on three-dimensional ptychography for thick sample, Acta Physical Sinica, vol. 65, No. 1, Jan. 8, 2016 (Jan. 8, 2016).

Rong, Hua et al. A new method for precise determination of incident electron beam direction by system tilting, Physical Testing and Chemical Analysis Part A: Physical Testing, vol. 30, No. 5, pp. 40-43, Oct. 15, 1994.

Priya Dwivedi et al. Lateral position correction in ptychography using the gradient of intensity patterns, Ultramicroscopy, vol. 192, pp. 29-36, Apr. 14, 2018.

* cited by examiner

ELECTRON PTYCHOGRAPHY METHOD AND APPARATUS FOR AUTOMATICALLY CORRECTING MISTILT OF ZONE AXIS OF SAMPLE

CROSS REFERENCE TO RELATED APPLICATION

This application claims priority to Chinese Patent Application No. 202110900738.3, filed on Aug. 6, 2021, and Chinese Patent Application No. 202110914428.7, filed on Aug. 10, 2021, which are hereby incorporated in their entirety by reference. This application is a continuation under 35 U.S.C. § 120 of international patent application PCT/CN2022/110146, entitled "Electron Ptychography Method and Apparatus for Automatically Correcting Zone Axis Mis-tilt of Sample" filed on Aug. 4, 2022, the content of which is also hereby incorporated by reference.

TECHNICAL FIELD

The present disclosure relates to the technology field of microscopy imaging, and more particularly, to an electron ptychography method and an electron ptychography apparatus for automatically correcting a mistilt of a zone axis of a sample.

BACKGROUND

A conventional electron microscopy imaging method plays an important role in characterizing the microstructure of materials. The conventional electron microscopy imaging method includes high-resolution transmission electron microscopy imaging, and annular dark-field imaging, annular bright-field imaging, bright-field imaging, and differential phase contrast imaging in scanning transmission electron microscopy imaging, etc. However, quality of high-resolution images obtained by these imaging methods are affected by the sample tilt. When a zone axis of the sample deviates, artificial contrast may appear in an atomically resolved image, and errors are induced in the measurement of the relative displacements between different atomic columns due to channeling effect, which causes a great difficulty in quantitatively characterizing structural information of the sample. There has been no effective method to address the effect of the zone axis mis-tilt of the sample yet.

Ptychography is a method for achieving ultra-high resolution in the field of the electron microscopy. The ptychography has an advantage that electron beams can be reconstructed simultaneously, so that the resolution of the image is no longer limited by aberrations. With introduction of a multi-slice approach, the ptychography can solve a problem of multiple scattering in the electron microscopy field and has a certain depth resolution.

SUMMARY

An embodiment according to one aspect of the present disclosure provides an electron ptychography method for automatically correcting a mistilt of a zone axis of a sample, and the method includes following steps.

A diffraction pattern of each scan point of the sample is acquired by scanning the sample through using an electron beam.

An object function and an electron beam function are initialized, and a forward propagation model is constructed according to a propagation function between sample slices.

A variable parameter of the propagation function between the sample slices includes a tilt angle of a zone axis of the sample relative to an electron beam direction. A loss function is calculated to be a difference between a calculated diffraction pattern and the acquired diffraction pattern, where the calculated diffraction pattern is obtained from the forward propagation model and parameters to be optimized.

Gradients of the loss function with respect to the parameters to be optimized are calculated respectively, and the parameters to be optimized are optimized according to the gradients.

The calculating the loss function of the forward propagation model, the calculating the gradients of the loss function with respect to the parameters to be optimized respectively, and the optimizing the parameters to be optimized according to the gradients are executed iteratively, till a termination condition for iterations is satisfied. The optimized parameters are outputted.

To achieve the above object, an embodiment according to another aspect of the present disclosure provides an electron ptychography apparatus for automatically correcting tilt of a sample zone axis, which includes: an acquisition module, a calculation module, an optimization module and an imaging module.

The acquisition module is configured to acquire a diffraction pattern of each scan point of the sample by scanning the sample through using the electron beam.

The calculation module is configured to initialize an object function and an electron beam function, and construct a forward propagation model according to a propagation function between sample slices, and calculate a loss function to be a difference between a calculated diffraction pattern and the acquired diffraction pattern, where the calculated diffraction pattern is obtained from the forward propagation model and parameters to be optimized. A variable parameter of the propagation function between the sample slices includes a tilt angle of a zone axis of the sample relative to an electron beam direction.

The optimization module is configured to calculate gradients of the loss function with respect to the parameters to be optimized, respectively, and optimize the parameters to be optimized according to the gradients.

The imaging module is configured to execute the calculating the loss function of the forward propagation model, the calculating the gradients of the loss function with respect to the parameters to be optimized respectively, and the optimizing the parameters to be optimized according to the gradients, iteratively, till a termination condition for iterations is satisfied, and configured to output the optimized parameter.

To achieve the above objective, an embodiment according to yet another aspect of the present disclosure provides a computer device. The computer includes a memory and a processor. The memory has a computer program stored thereon, and the processor, when executing the computer program, performs steps of the method of the embodiment above.

To achieve the above objective, an embodiment according to yet another aspect of the present disclosure provides a non-transitory computer readable storage medium, having a computer program stored thereon. The computer program, when executed by a processor, causes the processor to performs steps of the method of the embodiment above.

According to the electron ptychography method for automatically correcting the zone axis mis-tilt of the sample provided in the embodiments of the present disclosure, the electron beam scans the sample to acquire a series of diffraction patterns to serve as data. The tilt angles, which include the first tilt angle and the second tilt angle, are introduced into the Fresnel near-field diffraction propagation function, i.e., into the propagation function between the sample slices, which describes the propagation of the electron wave function in the sample. The first tilt angle and the second tilt angle are updated by using the iterative optimization algorithm of the ptychography by means of the gradients of the loss function with respect to the first tilt angle and the second tilt angle respectively, and finally the tilt angle of the zone axis of the sample relative to the incident electron beam direction and the projection potential of the sample at the zone axis are obtained. A defect that, when the zone axis of the sample tilts, it is difficult for the electron microscope to acquire a high space-resolution image and a high precision structure information is overcome, and the projection potential of the sample having a sub-angstrom resolution may be obtained when the zone axis of the sample tilts.

Additional aspects and advantages of the present disclosure will be partly presented in the following description, and will partly become obvious from the following description or be learned by the practice of the present disclosure.

DETAILED DESCRIPTION OF THE EMBODIMENTS

Figure 1:
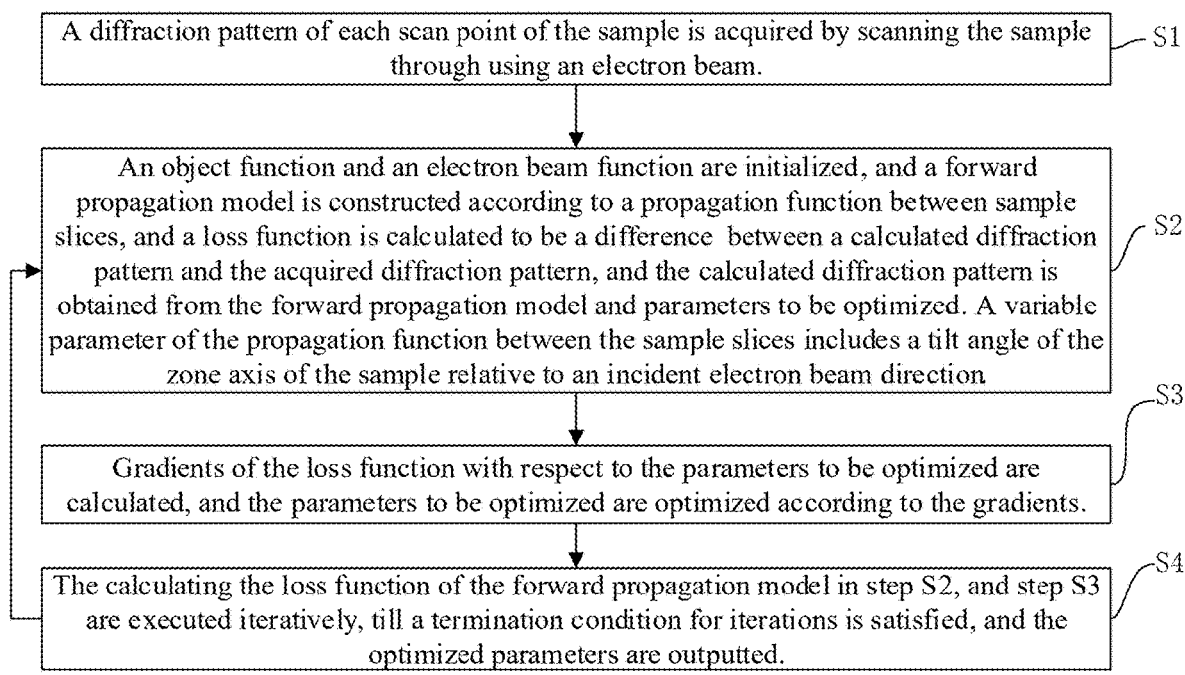
FIG. 1 is a flow chart of an electron ptychography method for automatically correcting a mistilt of a zone axis of a sample according to an embodiment of the present disclosure.

Embodiments of the present disclosure are described in detail below, and examples of the embodiments are illustrated in the accompanying drawings, wherein identical or similar reference numerals refer to identical or similar elements or elements having identical or similar functions throughout. The embodiments described below by reference to the accompanying drawings are exemplary and are intended to explain the present disclosure but should not to be construed as limiting the present disclosure.

In the conventional ptychography, the sample is required to be located close to the zone axis to obtain a reconstruction result with high quality, which limits an application scenario of the ptychography. The present disclosure provides an electron ptychography method and an electron ptychography apparatus for automatically correcting a mistilt of a zone axis of a sample, and can address at least one of the technical problems of the related art to some extent and solve the problem of image quality decrease caused by the zone axis mis-tilt of the sample in ptychography. The electron ptychography method and the electron ptychography apparatus for automatically correcting the zone axis mis-tilt of the sample according to embodiments of the present disclosure are described below with reference to the accompanying drawings, which are applicable to, but not limited to, a scanning transmission electron microscope.

FIG. 1 is a flow chart of an electron ptychography method for automatically correcting a mistilt of a zone axis of a sample according to an embodiment of the present disclosure.

As shown in FIG. 1, the electron ptychography method for automatically correcting the zone axis mis-tilt of the sample includes the following step S1 to step S4.

In step S1, a diffraction pattern of each scan point of the sample is acquired by scanning the sample through using an electron beam.

In an embodiment of the present disclosure, the sample, an electron source and a detector are included. The sample is scanned by the electron beam sent out by the electron source, and a scattered signal of each scan point is recorded by the detector, and the diffraction pattern of each scan point is acquired.

In step S2, an object function and an electron beam function are initialized, and a forward propagation model is constructed according to a propagation function between sample slices, and a loss function of the forward propagation model is calculated. A variable parameter of the propagation function between the sample slices includes a tilt angle of the zone axis of the sample relative to an incident electron beam direction.

Further, in an embodiment of the present disclosure, matrixes of the object function and the electron beam function are initialized. The object function of each lamella has a modulus of 1 and a random phase, and the electron beam function P(r) is constructed according to a aperture function and an aberration function:

$$P(r) = \mathcal{F}\{A(k)e^{i\chi(k)}\}$$

where, A(k) is a matrix and denotes the aperture function, and χ(k) is a matrix and denotes the aberration function, r denotes a real-space coordinate, and k denotes a reciprocal-space coordinate.

In some embodiments, the loss function is calculated to be a difference between a calculated diffraction pattern and the acquired diffraction pattern. Where, the calculated diffraction pattern is obtained from the forward propagation model and parameters to be optimized. More specifically, the calculated diffraction pattern is obtained based on the object function, the electron beam function. Further, in an embodiment of the present disclosure, the loss function is defined as a function with respect to the object function, the electron beam function, etc. The loss function $\mathcal{L}$ is, but not limited to:

$$\mathcal{L} = \sum_j \||\mathcal{F}\{\varphi_{ext,j}\}| - \sqrt{I_j}\|_{F'}^2$$

Where, j represents a sequence number of the scan point, |•| represents calculating a modulus of each element of a matrix, $\mathcal{F}\{•\}$ represents calculating a Fourier transform of a matrix, $\|•\|_{F'}$ represents calculating Frobenius norm of a matrix, $\varphi_{ext,j}$ represents an emergent wave function to be optimized, and I represents an acquired diffraction intensity matrix.

In an embodiment of the present disclosure, the emergent wave function $\varphi_{ext}$ in the forward propagation model may be expressed as:

$$\varphi_{ext,j} = \mathcal{P}_{\Delta z,\theta}\{\ldots \mathcal{L}_{\Delta z,\theta}\{\mathcal{L}_{\Delta z,\theta}\{P(r-r_j)O_1(r)\}_2(r)\}_3(r)\ldots\}O_N(r),$$

where, $P(r-r_j)$ is a matrix and represents an electron beam scanning a j-th position, and $O_i$ is a matrix and represents an object function of an i-th slice. The sample is divided into N slices, and i is an integer from 1 to N. It is assumed that the object function of each lamella has a same thickness and a same tilt angle. $\mathcal{L}_{\Delta z,\theta}\{•\}$ represents a Fresnel near-field propagation, and can be expressed as:

$$\mathcal{L}_{\Delta z,\theta}\{•\} = \mathcal{F}^{-1}\{\mathcal{F}\{•\}p(k;\Delta z,\theta)\}$$

where, $$p(k;\Delta z,\theta) = \exp[-i\pi\Delta z(\lambda k^2 - 2k_x \tan\theta_x - 2k_y \tan\theta_y)],$$

where, $\Delta z$ represents the thickness of the object function of each slice. $\lambda$ denotes a wavelength of the electron beam, $k_x$ and $k_y$ denotes an x-axis coordinate and a y-axis coordinate of the reciprocal-space coordinate k. $\theta = (\theta_x, \theta_y)$ represents the tilt angle of the zone axis of the sample relative to the electron beam direction, which includes a first tilt angle $\theta_x$ and a second tilt angle $\theta_y$. The first tilt angle $\theta_x$ and the second tilt angle $\theta_y$ are the parameters to be optimized, and the corresponding parameters are iteratively optimized by calculating gradients of the loss function $\mathcal{L}$ with respect to the parameters of the object function $O_i$ of the i-th lamella, the first tilt angle $\theta_x$, the second tilt angle $\theta_y$, etc., respectively.

In step S3, gradients of the loss function with respect to the parameters to be optimized are calculated, and the parameters to be optimized are optimized according to the gradients.

In an embodiment of the disclosure, the parameters to be optimized include the object function, the electron beam function, the tilt angle of the zone axis of the sample relative to the electron beam direction including the first tilt angle and the second tilt angle. The gradients of the loss function with respect to the parameters of the object function $O_i$ of the i-th lamella, the electron beam function P, the first tilt angle $\theta_x$, the second tilt angle $\theta_y$, etc., are calculated.

Specifically, the solution for gradients may be implemented by using a software library having an automatic derivation function. In an embodiment, for example, the gradient of the loss function with respect to the tilt angle $\theta_m$ (m=x or y) may be implemented by the following expressions:

$$\frac{\partial \mathcal{L}}{\partial \theta_m} = 2\sum_j \sum_q \mathcal{R}\{(\psi_j - \psi_j^{FP})^* \mathcal{F}\{\varphi_{ext,j}^{\theta_m}\}\}$$

$$\psi_j = \mathcal{F}\{\varphi_{ext,j}\}$$

$$\psi_j^{FP} = \frac{\sqrt{I_j}}{|\psi_j|}\psi_j,$$

where, a computing method of $\varphi_{ext,j}^{\theta_m}$ is similar to a computing method of the $\varphi_{ext,j}$, and a Fresnel near-field propagation function $p(k;\Delta z,\theta)$ corresponding to any $\mathcal{P}_{\Delta z,\theta}$ is replaced with a derivative of the Fresnel near-field propagation function p with respect to the tilt angle $\theta_m$, for example, when the object function contains an even number (N) of slices, the Fresnel near-field propagation function of the (N/2)-th lamella is replaced:

$$\varphi_{ext,j}^{\Delta z} = \mathcal{P}_{\Delta z,\theta}\{\ldots \mathcal{P}_{\Delta z,\theta}^{\Delta z}\{\ldots \mathcal{P}_{\Delta z,\theta}\{P(r-r_j)O_1(r)\}O_2(r)\ldots\}O_{N/2}(r)\ldots\}O_N(r)$$

$$\varphi_{ext,j}^{\theta_m} = \mathcal{P}_{\Delta z,\theta}\{\ldots \mathcal{P}_{\Delta z,\theta}^{\theta_m}\{\ldots \mathcal{P}_{\Delta z,\theta}\{P(r-r_j)O_1(r)\}O_2(r)\ldots\}O_{N/2}(r)\ldots\}O_N(r)$$

$$\mathcal{P}_{\Delta z,\theta}^{\Delta z}\{•\} = \mathcal{F}^{-1}\left\{\mathcal{F}\{•\}\frac{\partial p(k;\Delta z,\theta)}{\partial \Delta z}\right\}$$

$$\mathcal{P}_{\Delta z,\theta}^{\theta_m}\{•\} = \mathcal{F}^{-1}\left\{\mathcal{F}\{•\}\frac{\partial p(k;\Delta z,\theta)}{\partial \theta_m}\right\}$$

In an embodiment of the present application, after the gradients are calculated, the parameters to be optimized are updated by using the calculated gradients. As an example, the parameters to be optimized may be updated by the following equations:

$$O_i' = O_i - \alpha_{O_i}\frac{\partial \mathcal{L}}{\partial O_i}$$

$$P' = P - \alpha_P \frac{\partial \mathcal{L}}{\partial P}$$

$$\theta_x' = \theta_x - \alpha_{\theta_x}\frac{\partial \mathcal{L}}{\partial \theta_x}$$

$$\theta_y' = \theta_y - \alpha_{\theta_y}\frac{\partial \mathcal{L}}{\partial \theta_y}$$

where, $O_i'$ represents the updated object function of the i-th lamella, $P'$ represents the updated electron beam function, $\theta_x'$ represents the updated first tilt angle, $\theta_y'$ represents the updated second tilt angle, $\alpha_{O_i}$ represents a learning rate of the object function $O_i$ of the i-th lamella, $\alpha_P$ represents a learning rate of the electron beam function P, $\alpha_{\theta_x}$ represents a learning rate of the first tilt angle $\theta_x$, $\alpha_{\theta_y}$ represents a learning rate of the second tilt angle $\theta_y$, $$\frac{\partial \mathcal{L}}{\partial O_i}$$

represents the gradient of the loss function with respect to the object function of the i-th lamella, $$\frac{\partial \mathcal{L}}{\partial P}$$

represents the gradient of the loss function with respect to the electron beam function, $$\frac{\partial \mathcal{L}}{\partial \theta_x}$$

represents the gradient of the loss function with respect to the first tilt angle $\theta_x$, and $$\frac{\partial \mathcal{L}}{\partial \theta_y}$$

represents the gradient of the loss function with respect to the second tilt angle $\theta_y$.

In step S4, the calculating the loss function of the forward propagation model in step S2, and step S3 are executed iteratively, till a termination condition for iterations is satisfied, and the optimized parameters are outputted.

The optimized first tilt angle and the optimized second tilt angle compose the final tilt angle of the zone axis of the sample relative to the electron beam direction, and the optimized object function is a final projection potential of the sample along the zone axis.

Further, in an embodiment of the present disclosure, the termination condition for the iterations includes: the loss function converging, or, the number of the iterations reaching a preset iteration number threshold.

Specifically, the loss function is recalculated by using the parameters updated in step S3, and step S3 is repeatedly executed, and the iterations are repeated. The iterations do not end until the loss function converges or the number of iterations reaches the preset iteration number threshold, and finally the optimized parameters are obtained, and the sample imaging is performed by using the optimized parameters.

By the method of the above embodiment, the sample zone axis mis-tilt can be automatically corrected, thereby reducing influences of the sample zone axis mis-tilt on the resolution and precision of structure measurement, and relaxing the experimental requirements for the electron microscopy, so that the ptychography can obtain the super-high resolution and a picometer-level precision of the structure measurement even if the zone axis of the sample deviates from the incident electron beam significantly.

The electron ptychography method for automatically correcting the zone axis mis-tilt of the sample of the present disclosure will be described in detail below by a specific embodiment.

Figure 2:
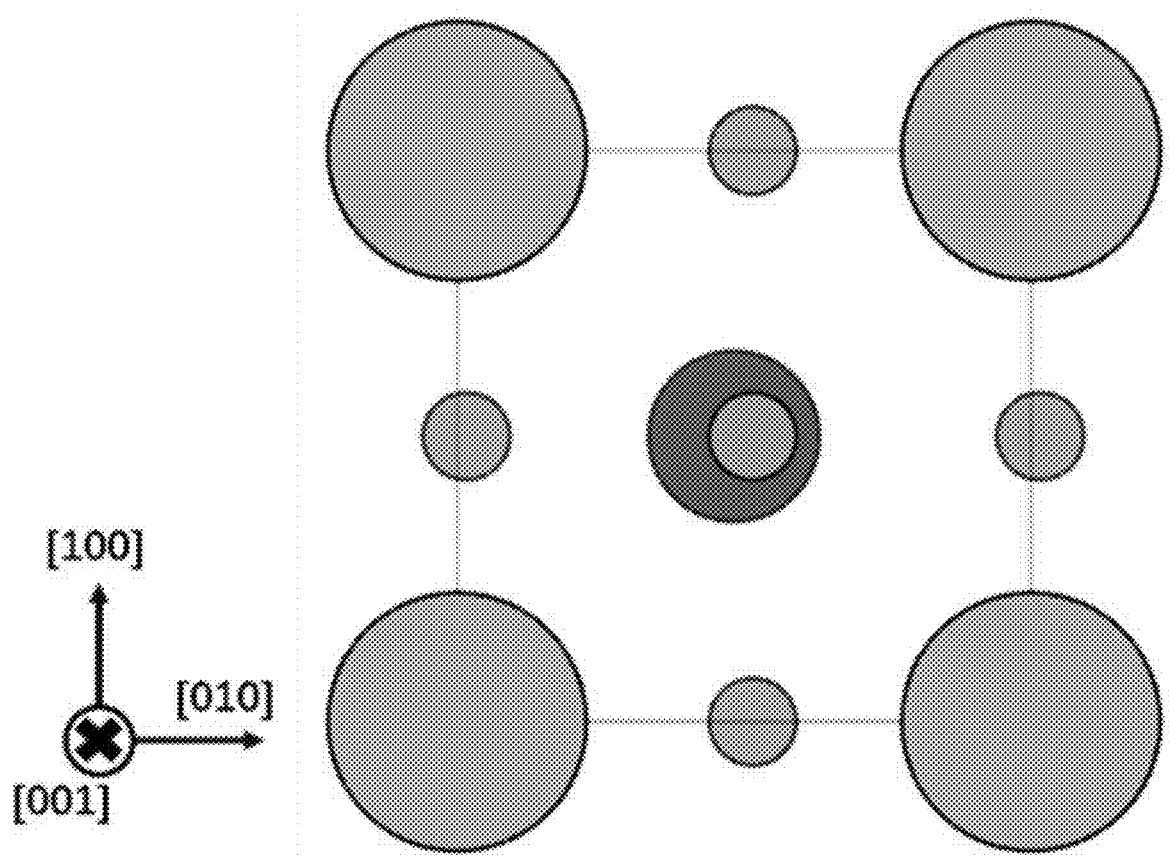
FIG. 2 illustrates a projection structure of a sample of barium titanate projected along a direction of [001] according to an embodiment of the present disclosure.

In this embodiment, what needs to be observed is a projection of the barium titanate projected along a direction [001]. The projection structure is shown in FIG. 2. For a conventional imaging method, the electron beam needs to be substantially parallel to the projection direction [001] of the barium titanate to acquire a correct high-resolution image.

Figure 3:
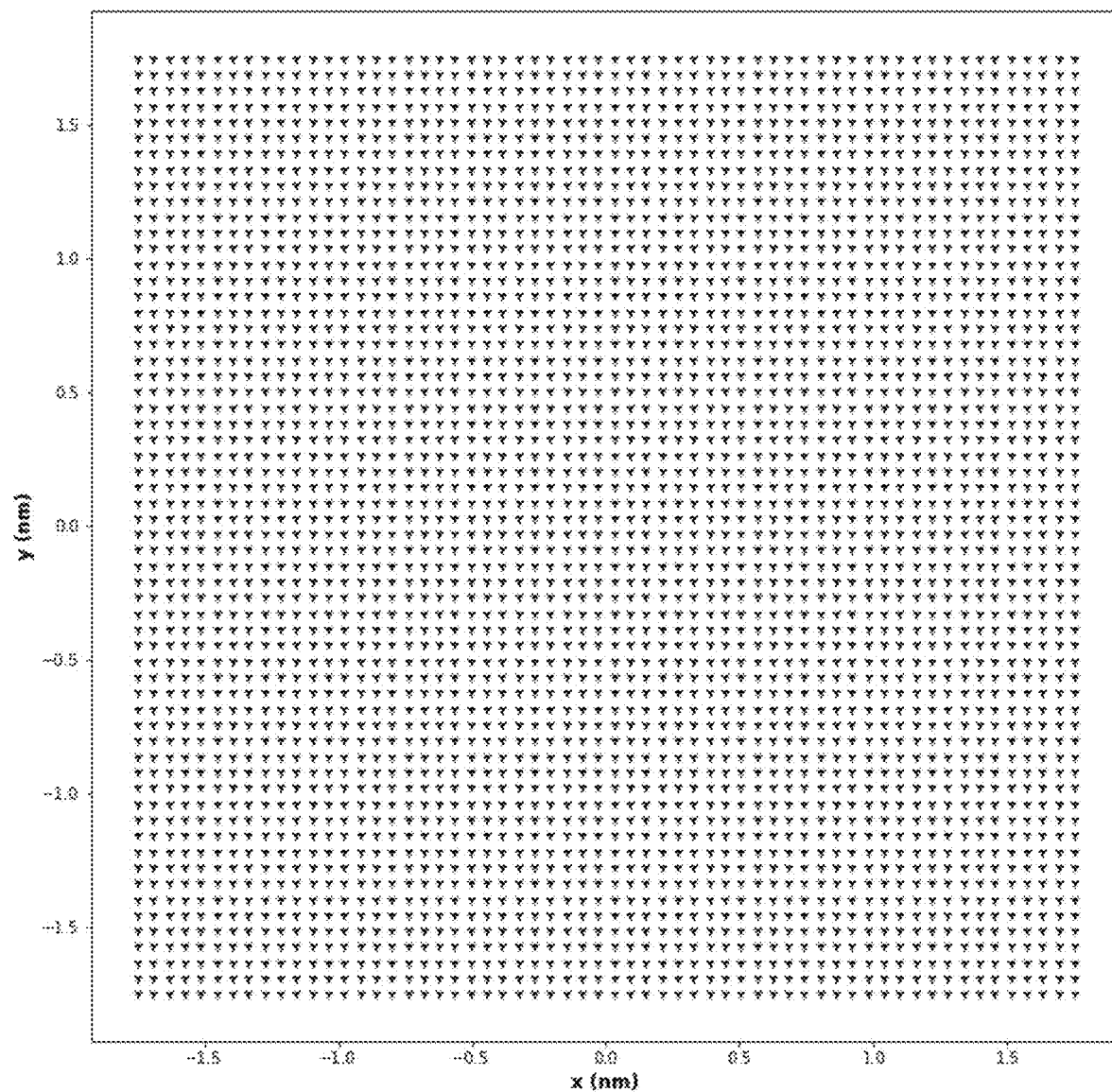
FIG. 3 is a diagram illustrating distribution of scan points of an electron beam according to an embodiment of the present disclosure.
Figure 4:
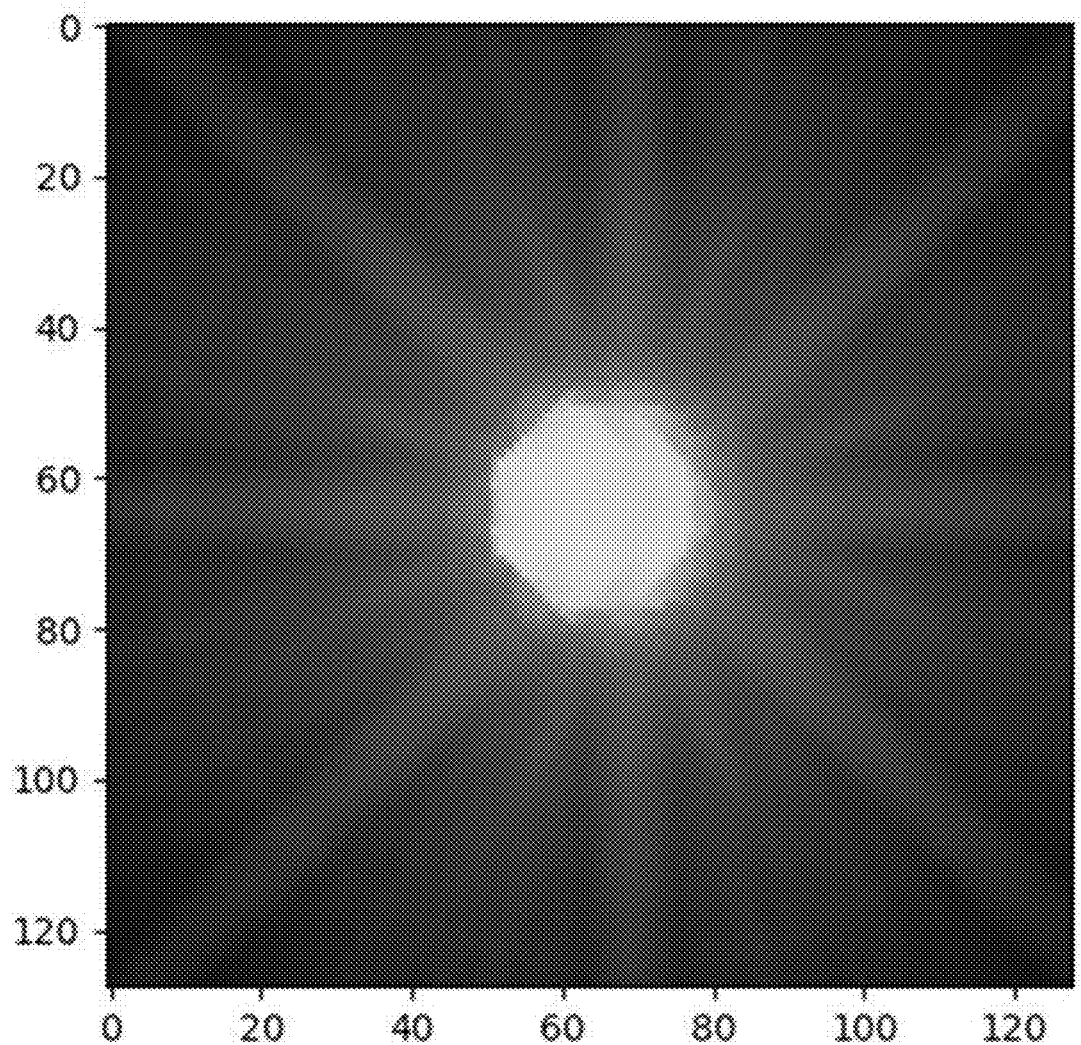
FIG. 4 is a schematic diagram illustrating an average of diffraction patterns of all scan points according to an embodiment of the present disclosure.

In this embodiment, the sample tilts away from the direction [001] by a tilt angle of 8 mrad. The electron beam scans the sample. FIG. 3 illustrates the scan points, which are distributed uniformly in a form of grids. The detector collects the diffraction pattern of each scanned position, and an average of all diffraction patterns is shown in FIG. 4, which uses a convergence semi-angle of 22 mrad and an under focus of 8 nm.

In other embodiments of the present disclosure, the distribution of the scan points may also be non-uniform. For example, a spacing between the scan points in an x-axis direction and a spacing between the scan points in a y-axis direction may be unequal. In some embodiments, the scan points are distributed in a helical shape. In other embodiments, an initial scan point may be set arbitrarily.

Figure 5:
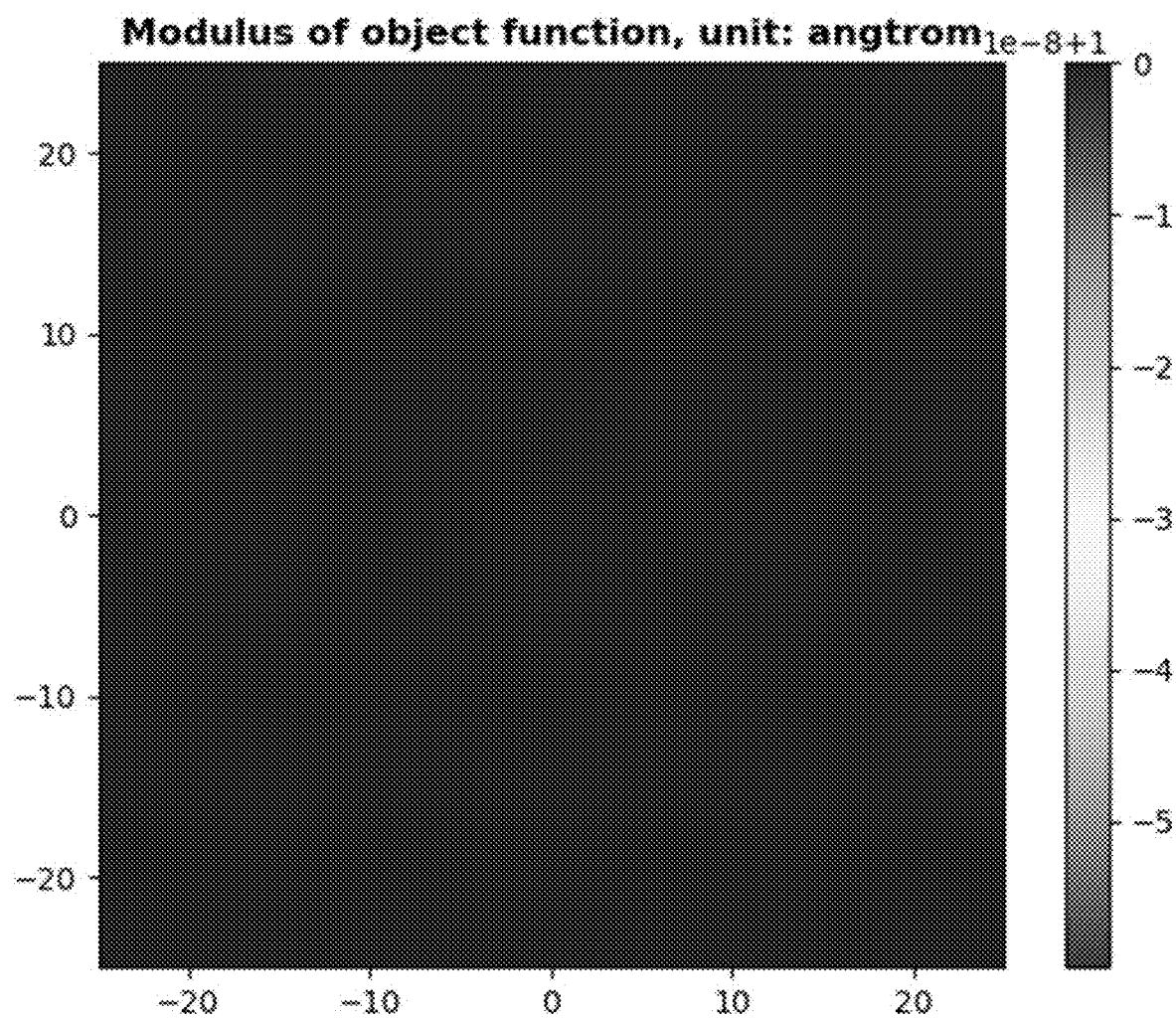
FIG. 5 is a diagram illustrating a modulus of an object function initialized by an iterative optimization algorithm according to an embodiment of the present disclosure.
Figure 6:
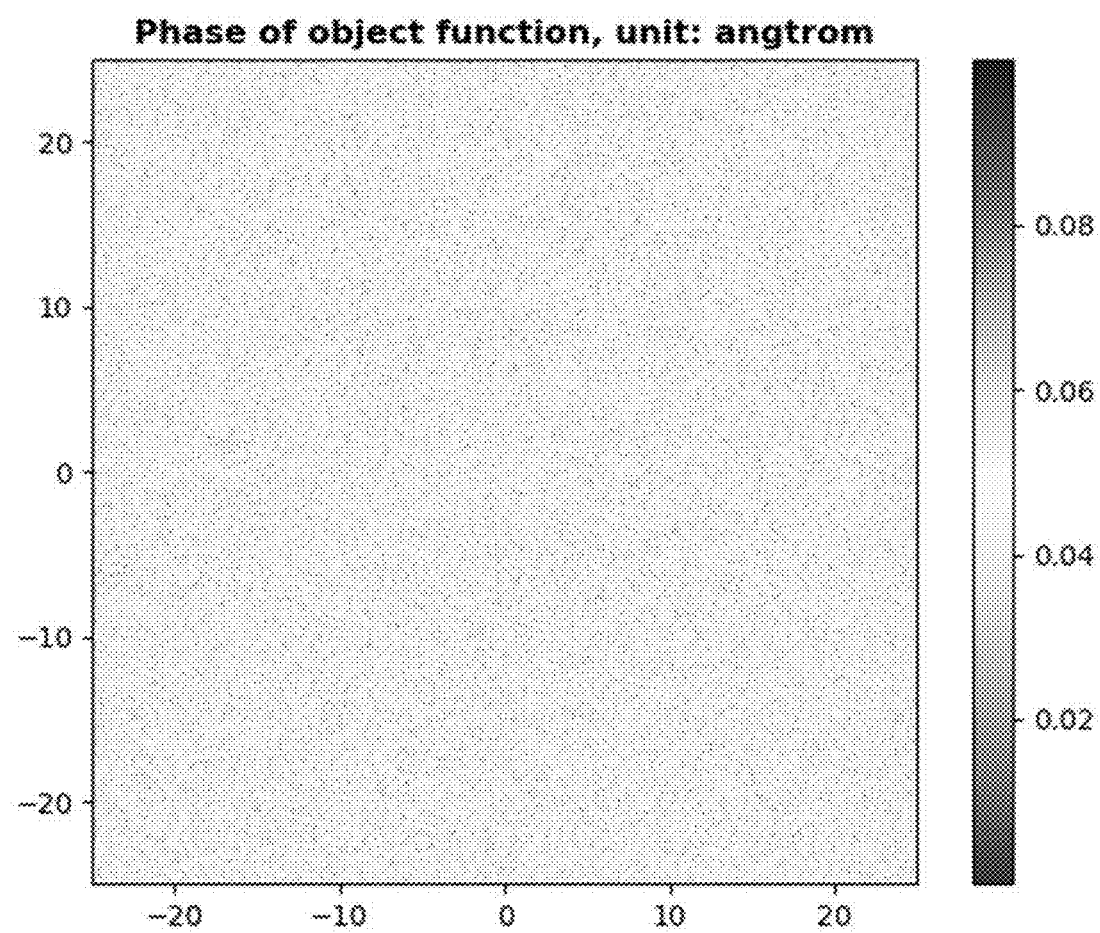
FIG. 6 is a diagram illustrating a phase of the object function initialized by the iterative optimization algorithm according to an embodiment of the present disclosure.
Figure 7:
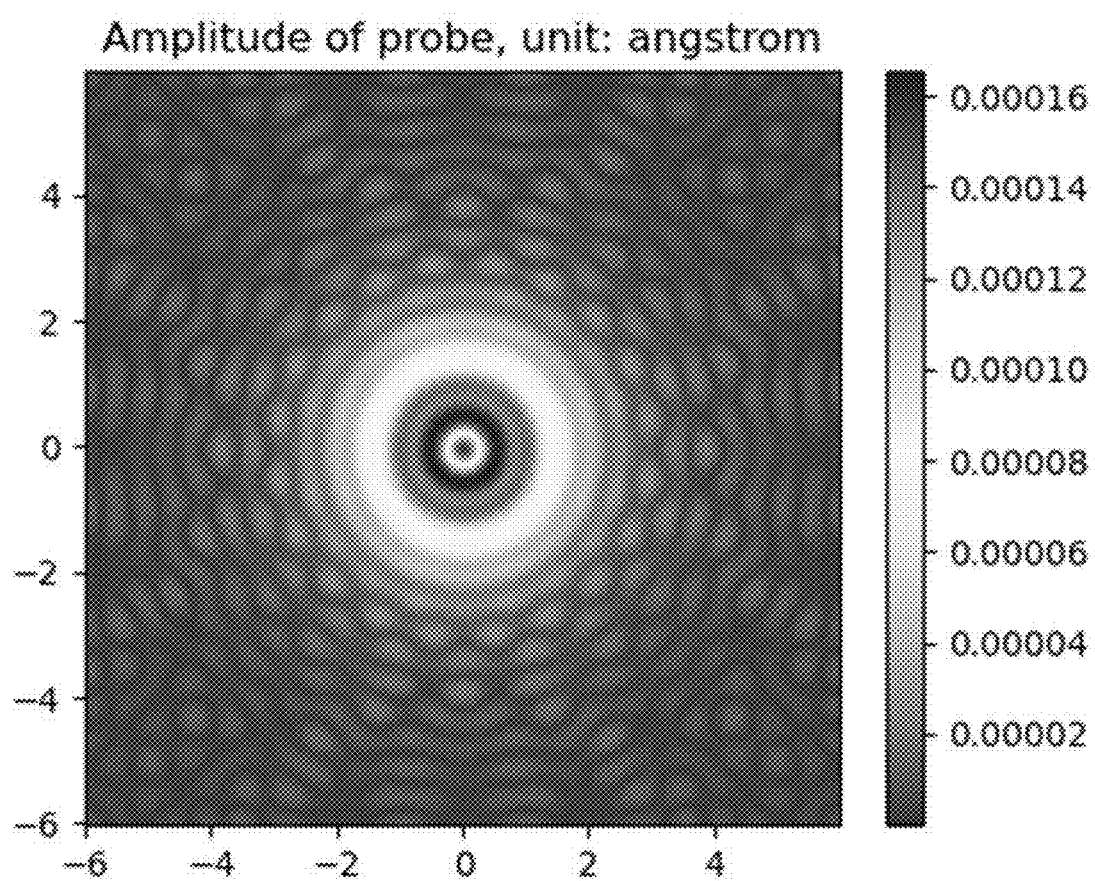
FIG. 7 is a diagram illustrating an amplitude of an electron beam function of an electron probe, initialized by the iterative optimization algorithm according to an embodiment of the present disclosure.
Figure 8:
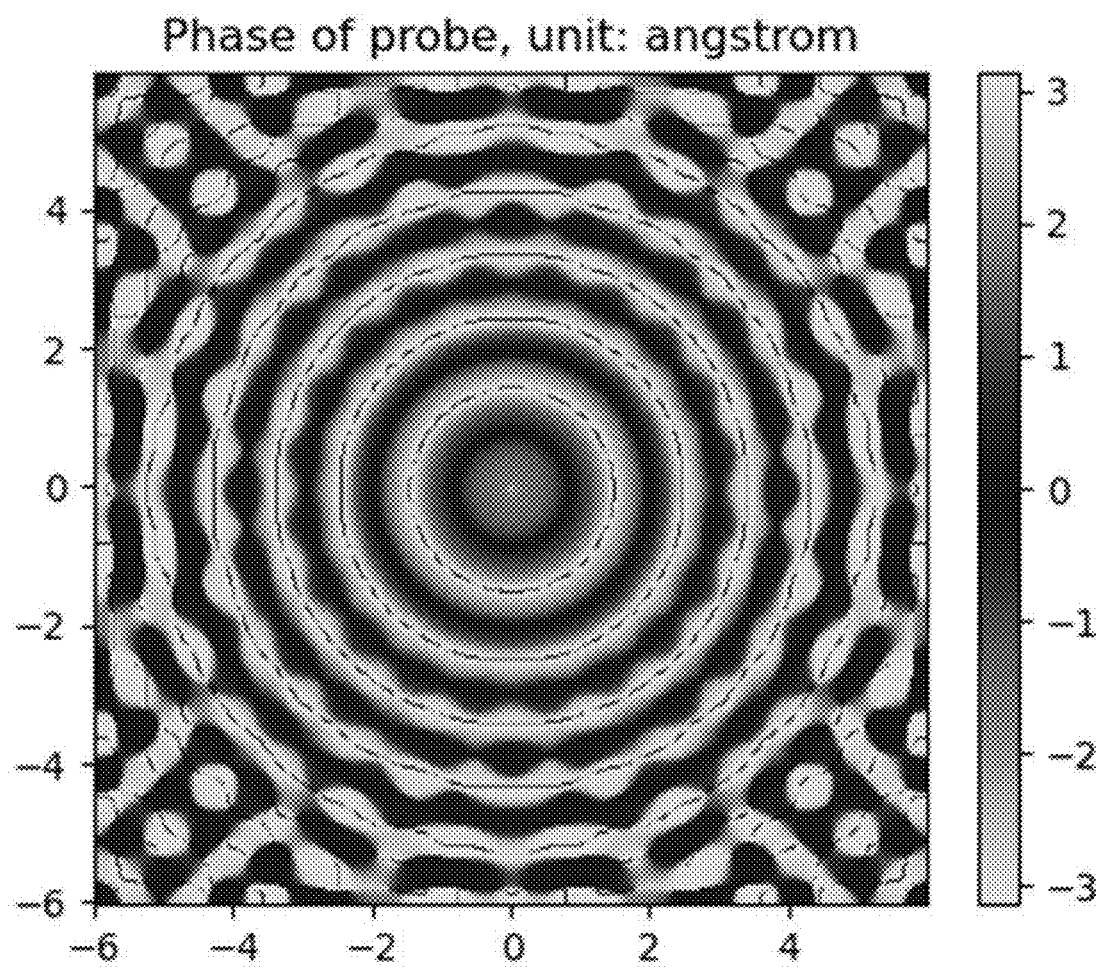
FIG. 8 is a diagram illustrating a phase of the electron beam function of the electron probe, initialized by the iterative optimization algorithm according to an embodiment of the present disclosure.

The object function and the electron beam function are initialized: the moduli of the object functions of all slices are the same, and constitute a matrix with elements each being 1, as shown in FIG. 5, and the phases of the object functions of all slices constitute a matrix with elements of random numbers, as shown in FIG. 6. The electron beam function is initialized by using a formula $P(r)=\mathcal{F}\{A(k)e^{i\chi(k)}\}$, the amplitude of the electron beam function is shown in FIG. 7, and the phase of the electron beam function is shown in FIG. 8.

The loss function $\mathcal{L}=\Sigma_j\|\mathcal{F}\{\varphi_{ext,j}\}|-\sqrt{I_j}\|_F^2$, and the gradients of the loss function with respect to the parameters respectively are calculated, and each of the parameters is iteratively updated by using the following formulas:

$$O'_i = O_i - \alpha_{O_i}\frac{\partial \mathcal{L}}{\partial O_i}$$

$$P' = P - \alpha_P\frac{\partial \mathcal{L}}{\partial P}$$

$$\theta'_x = \theta_x - \alpha_{\theta_x}\frac{\partial \mathcal{L}}{\partial \theta_x}$$

$$\theta'_y = \theta_y - \alpha_{\theta_y}\frac{\partial \mathcal{L}}{\partial \theta_y}$$

Figure 9:
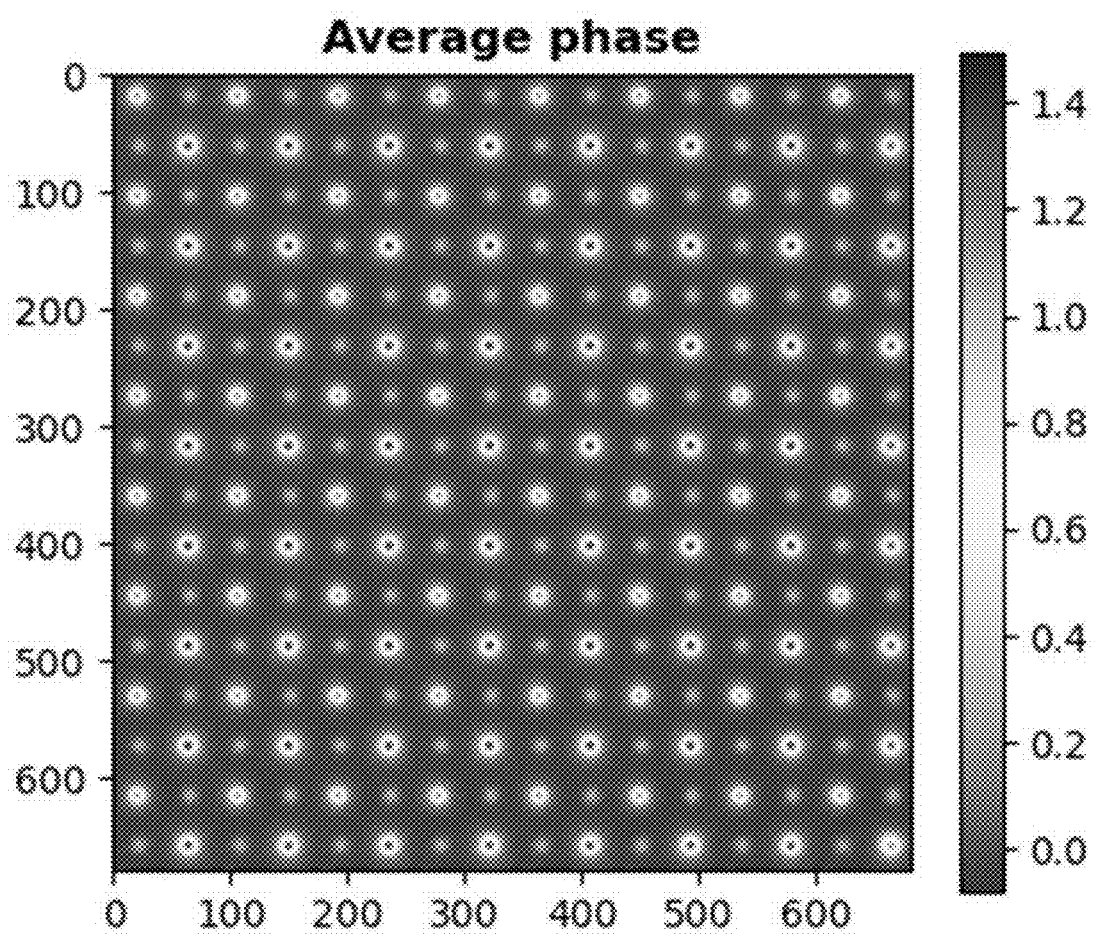
FIG. 9 is a diagram illustrating an average phase of the object function reconstructed by the iterative optimization algorithm according to an embodiment of the present disclosure.
Figure 10:
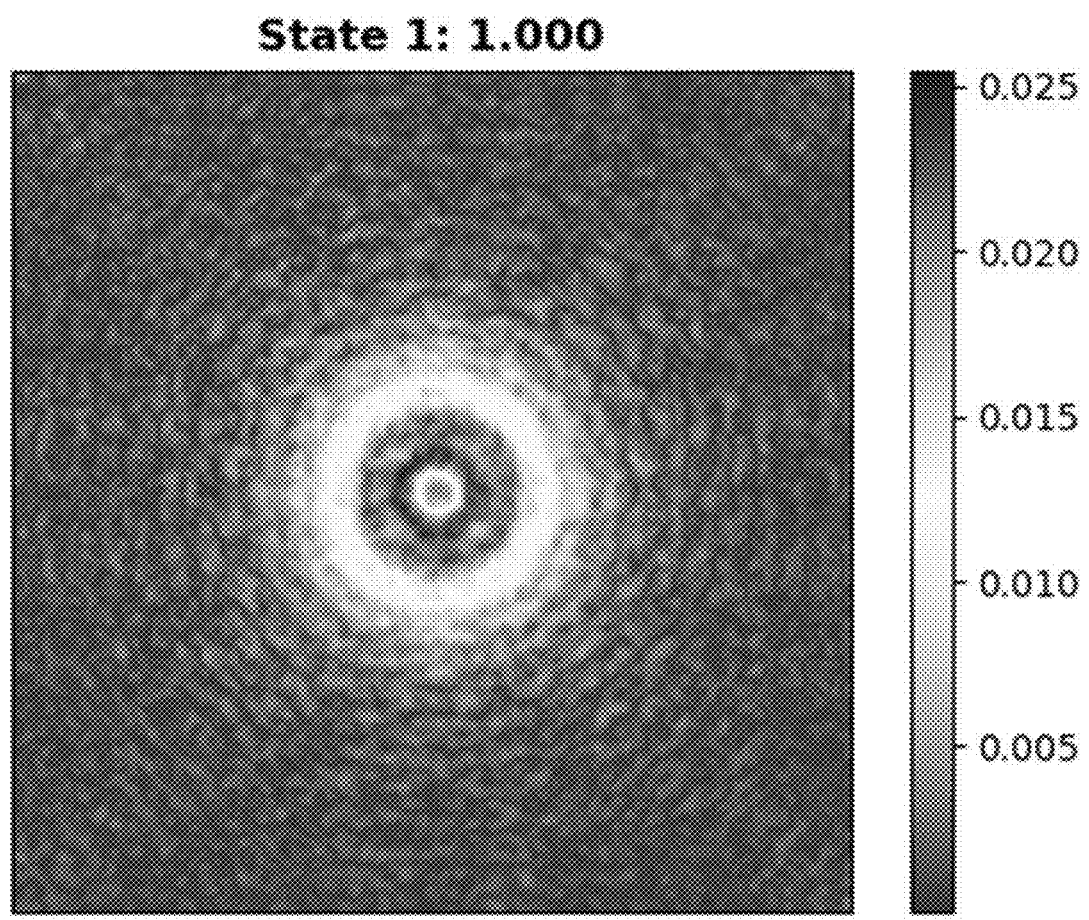
FIG. 10 is a diagram illustrating an amplitude of an electron beam function reconstructed by the iterative optimization algorithm according to an embodiment of the present disclosure.
Figure 11:
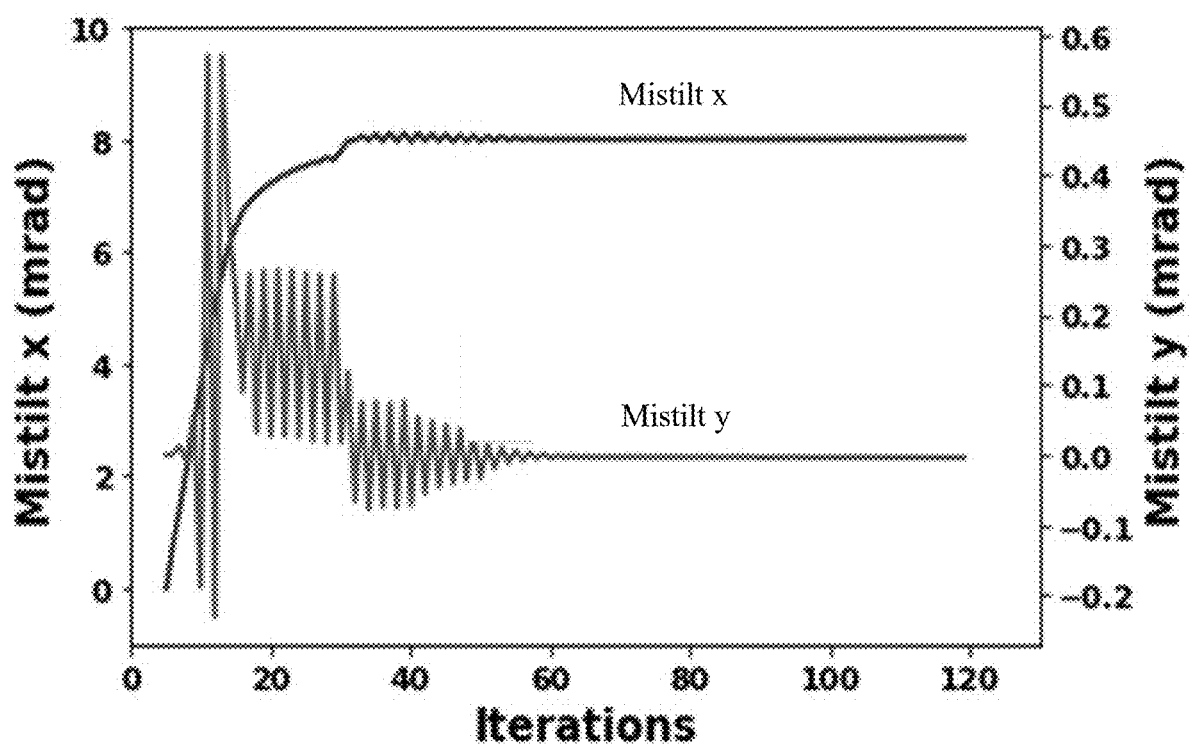
FIG. 11 is schematic diagram illustrating a variation curve of mistilt of a first tilt angle (Mistilt x) and a variation curve of mistilt of a second tilt angle (Mistilt y) of the sample during an iteration of the iterative optimization algorithm according to an embodiment of the present disclosure.

The average phase of the object functions of all the slices, as shown in FIG. 9, is finally obtained. The amplitude of the electron beam function, as shown in FIG. 10, is finally obtained. The variation of the tilt angles of the zone axis mis-tilt relative to the incident electron beam direction along with the variation of the number of iterations, as shown in FIG. 11, is finally obtained.

According to the electron ptychography method for automatically correcting the zone axis mis-tilt of the sample provided in the embodiments of the present disclosure, the electron beam scans the sample to acquire a series of diffraction patterns to serve as data. The tilt angles, which include the first tilt angle and the second tilt angle, are introduced into the Fresnel near-field diffraction propagation function, i.e., into the propagation function between the sample slices, which describes the propagation of the electron wave function in the sample. The first tilt angle and the second tilt angle are updated by using the iterative optimization algorithm of the ptychography by means of the gradients of the loss function with respect to the first tilt angle and the second tilt angle respectively, and finally the tilt angle of the zone axis of the sample relative to the incident electron beam direction and the projection potential of the sample along the zone axis are obtained. A defect that, when the zone axis of the sample tilts away from the incident beam, it is difficult for the electron microscope to acquire a high space-resolution image and a high precision structure information is overcome, and the projection potential of the sample having a sub-angstrom resolution may be obtained when the zone axis of the sample tilts away from the incident beam.

An electron ptychography apparatus for automatically correcting a mistilt of the zone axis of a sample according to an embodiment of the present disclosure is described below with reference to the accompanying drawing.

Figure 12:
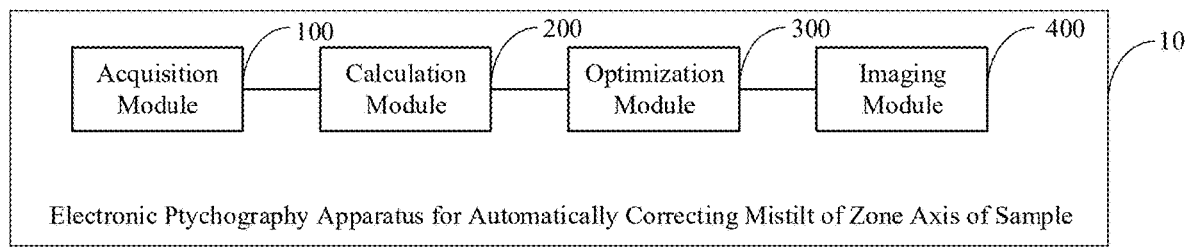
FIG. 12 is a schematic view illustrating a structure of an electron ptychography apparatus for automatically correcting a mistilt of the zone axis of the sample according to an embodiment of the present disclosure.

FIG. 12 is a schematic diagram illustrating the electron ptychography apparatus for automatically correcting the sample zone axis mis-tilt according to an embodiment of the present disclosure.

As shown in FIG. 12, the electron ptychography apparatus for automatically correcting the zone axis mis-tilt of the sample 10 includes an acquisition module 100, a calculation module 200, an optimization module 300, and an imaging module 400.

The acquisition module 100 is configured to acquire a diffraction pattern of each scan point of the sample by scanning the sample through using an electron beam. The acquisition module may be, but is not limited to, a scanning transmission microscope. The calculation module 200 is configured to initialize an object function and an electron beam function, and construct a forward propagation model according to a propagation function between sample slices, and calculate a loss function of the forward propagation model. A variable parameter of the propagation function between the sample slices includes a tilt angle of the zone axis of the sample relative to an electron beam direction. The optimization module 300 is configured to calculate gradients of the loss function with respect to the parameters to be optimized, and optimize the parameters to be optimized according to the gradients. The imaging module 400 is configured to execute the calculating the loss function of the forward propagation model, the calculating the gradients of the loss function with respect to the parameters to be optimized and the optimizing the parameters to be optimized according to the gradients, iteratively, till a termination condition for iterations is satisfied, and is configured to output the optimized parameters.

The optimized first tilt angle and the optimized second tilt angle compose a final tilt angle of the zone axis of the sample relative to the electron beam direction, and the optimized object function is a final projection potential of the sample on a zone axis.

Further, in an embodiment of the present disclosure, an initialization of the object function includes configuring the object function of each lamella to have a random phase and a modulus of 1.

Further, in an embodiment of the disclosure, the parameters to be optimized include the object function, the electron beam function, the tilt angle of the zone axis of the sample relative to the electron beam direction including the first tilt angle and the second tilt angle.

Further, in an embodiment of the present disclosure, the emergent wave function $\varphi_{ext,j}$ in the forward propagation model is:

$$\varphi_{ext,j} = \mathcal{P}_{\Delta z,\theta}\{\ldots\{\mathcal{P}_{\Delta z,\theta}\{P(r-r_j)O_1(r)\}O_2(r)\}O_3(r)\ldots\}O_N(r),$$

where, $P(r-r_j)$ represents the electron beam scanning a j-th position, and $O_i$ represents the object function of an i-th lamella. $\mathcal{P}_{\Delta z,\theta}\{\bullet\}$ represents the Fresnel near-field diffraction action factor, and may be expressed as:

$$\mathcal{P}_{\Delta z,\theta}\{\bullet\} = \mathcal{F}^{-1}\{\mathcal{F}\{\bullet\}p(k;\Delta z,\theta)\}$$

where, $$p(k;\Delta z,\theta) = \exp[-i\pi\Delta z(\lambda k^2 - 2k_x\tan\theta_x - 2k_y\tan\theta_y)],$$

where, $\Delta z$ represents the thickness of the object function of each lamella. $\theta = (\theta_x, \theta_y)$ represents the tilt angle of the zone axis of the sample relative to the electron beam direction, which includes the first tilt angle $\theta_x$ and the second tilt angle $\theta_y$. $\lambda$ denotes a wavelength of the electron beam, $k_x$ and $k_y$ denotes an x-axis coordinate and a y-axis coordinate of the reciprocal-space coordinate. The first tilt angle $\theta_x$ and the second tilt angle $\theta_y$ are the variable parameters to be optimized.

Further, in an embodiment of the disclosure, the parameters to be optimized are optimized according to the gradients as follows:

$$O'_i = O_i - \alpha_{O_i}\frac{\partial \mathcal{L}}{\partial O_i}$$

$$P' = P - \alpha_P\frac{\partial \mathcal{L}}{\partial P}$$

$$\theta'_x = \theta_x - \alpha_{\theta_x}\frac{\partial \mathcal{L}}{\partial \theta_x}$$

$$\theta'_y = \theta_y - \alpha_{\theta_y}\frac{\partial \mathcal{L}}{\partial \theta_y}$$

where, $O_i'$ represents the updated object function of the i-th lamella, P' represents the updated electron beam function, $\theta_x'$ represents the updated first tilt angle, $\theta_y'$ represents the updated second tilt angle, $\alpha_{O_i}$ represents a learning rate of the object function $O_i$ of the i-th lamella, $\alpha_P$ represents a learning rate of the electron beam function P, $\alpha_{\theta_x}$ represents a learning rate of the first tilt angle $\theta_x$, $\alpha_{\theta_y}$ represents a learning rate of the second tilt angle $\theta_y$, $$\frac{\partial \mathcal{L}}{\partial O_i}$$

represents the gradient of the loss function with respect to the object function of the i-th lamella, $$\frac{\partial \mathcal{L}}{\partial O_i}$$

$$\frac{\partial \mathcal{L}}{\partial P}$$

represents the gradient of the loss function with respect to the electron beam function, $$\frac{\partial \mathcal{L}}{\partial \theta_x}$$

represents the gradient of the loss function with respect to the first tilt angle $\theta_x$, and $$\frac{\partial \mathcal{L}}{\partial \theta_y}$$

represents the gradient of the loss function with respect to the second tilt angle $\theta_y$.

Further, in an embodiment of the present disclosure, the termination condition for iterations includes:

the loss function converging, or, the number of iterations reaching a preset iteration number threshold.

It should be noted that the aforementioned description of the embodiments of the method embodiment are also applicable to the embodiments of the apparatus which will not be described repeatedly herein.

According to the electron ptychography apparatus for automatically correcting the zone axis mis-tilt of the sample provided in the embodiments of the present disclosure, the electron beam scans the sample to acquire a series of diffraction patterns to serve as data. The first tilt angle and the second tilt angle are introduced into the Fresnel near-field propagation function, i.e., into the propagation function between the sample slices, which describes the propagation of the electron wave function in the sample. The first tilt angle and the second tilt angle are updated by using the iterative optimization algorithm of the ptychography by means of the gradients of the loss function with respect to the first tilt angle and the second tilt angle respectively, and finally the tilt angle of the zone axis of the sample relative to the incident electron beam direction and the projection potential of the sample at the zone axis are obtained. A defect that, when the zone axis of the sample tilts away from the electron beam, it is difficult for the electron microscope to acquire a high space-resolution image and a high precision structure information is overcome, and the projection potential of the sample having a sub-angstrom resolution may be obtained when the zone axis of the sample tilts away from the electron beam.

Figure 13:
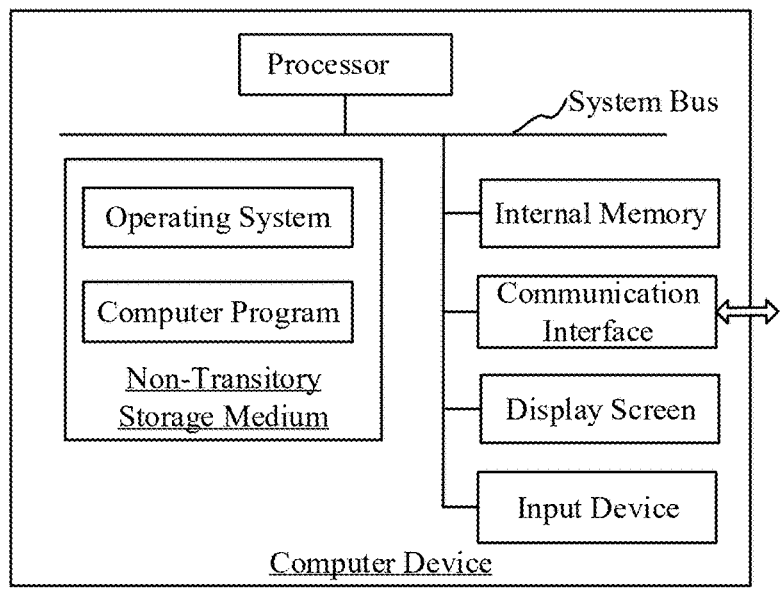
FIG. 13 is a schematic view illustrating an internal structure of a computer device according to an embodiment of the present disclosure.

In an embodiment, a computer device is provided. The computer device may be a terminal, and an internal structure of the computer device is shown in FIG. 13. The computer device includes a processor, a memory, a communication interface, a display screen, and an input device, which are connected by a system bus. The processor of the computer device is configured to provide computing and control capabilities. The memory of the computer device includes a non-transitory storage medium and an internal memory. The non-transitory storage medium stores an operating system and a computer program. The internal memory provides an environment for the operation of the operating system and the computer program in the non-transitory storage medium. The communication interface of the computer device is configured for wire or wireless communication with an external terminal, and the wireless communication may be implemented by WIFI, carrier network, NFC (near field communication) technology or any other technology. The computer program is executed by the processor to implement the electron ptychography method for automatically correcting the zone axis mis-tilt of the sample. The display screen of the computer device may be a liquid crystal display screen or an electronic ink display screen, and the input device of the computer device may be a touch layer covered on the display screen, or may be a key, a trackball or a touch pad provided on a housing of the computer device, or may be an external keyboard, a touch pad or a mouse.

It should be understood by those of ordinary skill in the art that the structure shown in FIG. 13 is a block diagram illustrating only part of the structure associated with the solutions of the present disclosure, but not intended to limit the computer device to which the solutions of the present disclosure are applied, and that the specific computer device may include more or less components than those shown in the figure, or may combine with certain components, or may have a different component arrangement.

In an embodiment, a computer device including a memory and a processor is provided. The memory has a computer program stored therein. The processor, when executing the computer program, implements the steps in the above method embodiments.

In an embodiment, a non-transitory computer readable storage medium is provided. A computer program is stored on the non-transitory computer readable storage medium, and the computer program, when executed by a processor, causes the processor to implement the steps in the above method embodiments.

Those of ordinary skill in the art may understand that all or part of the processes in the methods of the above embodiments may be achieved by relevant hardware instructed by the computer program, and the computer program may be stored in a non-transitory computer readable storage medium. The computer program, when being executed, performs the processes of the above methods in the embodiments. The memory, the storage, the database or other medium used in various embodiments provided in the present disclosure may include at least one of a non-transitory memory and a transitory memory. The non-transitory memory may include read only memory (ROM), magnetic tape, floppy disk, flash memory, optical memory, etc. The transitory memory may include random access memory (RAM) or external cache memory. For illustration rather than limitation, RAM may be in various forms, such as static RAM (SRAM) or dynamic RAM (DRAM), etc.

Furthermore, the terms "first" and "second" are used for description only, but should not be construed as indicating or implying relative importance or implicitly specifying the number of indicated technical features. Thus, the features defined by "first" and "second" may explicitly or implicitly include at least one of such features. In the description of the present disclosure, the "plurality" means at least two, such as two, three, etc., unless otherwise specified and defined.

In the description of this specification, the description of the terms "one embodiment", "some embodiments", "examples", "specific examples", or "some examples", etc., means that specific features, structures, materials, or characteristics described in connection with the embodiment(s) or the example(s) are included in at least one embodiment or example of the present disclosure. In this specification, the illustrative expression of the aforementioned terms are not necessarily directed to the same embodiment or the same example. Moreover, the described specific features, structures, materials, or characteristics may be combined in a suitable manner in any one or more embodiments or examples. In addition, info contradictions occur, for those skilled in the art, different embodiments or examples described in this specification and the features of the different embodiments or examples may be combined or associated with each other.

Although the embodiments of the present disclosure have been illustrated and described above, it should be understood that the above embodiments are exemplary and should not to be construed as limiting the disclosure, and variations, modifications, substitutions, and variants of the above embodiments may be made by those skilled in the art within the scope of the present disclosure.

What is claimed is:

1. An electron ptychography method for automatically correcting a mistilt of a zone axis of a sample, comprising:
acquiring a diffraction pattern of each scan point of the sample by scanning the sample through using an electron beam;
initializing an object function and an electron beam function, constructing a forward propagation model according to a propagation function between sample slices, a variable parameter of the propagation function between the sample slices comprising a tilt angle of a zone axis of the sample relative to an electron beam direction; and calculating a loss function to be a difference between a calculated diffraction pattern and the acquired diffraction pattern, the calculated diffraction pattern being obtained from the forward propagation model and parameters to be optimized;
calculating gradients of the loss function with respect to the parameters to be optimized respectively, and optimizing the parameters to be optimized according to the gradients; and
executing the calculating the loss function of the forward propagation model, the calculating the gradients of the loss function with respect to the parameters to be optimized respectively, and the optimizing the parameters to be optimized according to the gradients, iteratively, till a termination condition for iterations is satisfied; and outputting the optimized parameters.

2. The method of claim 1, wherein the parameters to be optimized comprise the object function, the electron beam function, and the tilt angle of the zone axis of the sample relative to the electron beam direction; and the tilt angle comprises a first tilt angle and a second tilt angle.

3. The method of claim 1, wherein an emergent wave function in the forward propagation model is:

$$\varphi_{ext,j} = \mathcal{P}_{\Delta z,\theta}\{\mathcal{P}_{\Delta z,\theta}\{\mathcal{P}_{\Delta z,\theta}\{P(r-r_j)O_1(r)\}O_2(r)\}O_3(r)\ldots\}_N(r),$$

wherein, $P(r-r_j)$ represents the electron beam scanning a j-th position; $O_i$ represents the object function of an i-th lamella; $\mathcal{P}_{\Delta z,\theta}\{\cdot\}$ represents a Fresnel near-field diffraction action factor, and the action factor is:

$$\mathcal{P}_{\Delta z,\theta}\{\cdot\} = \mathcal{F}^{-1}\{\mathcal{F}\{\cdot\}p(k;\Delta z,\theta)\}$$

wherein, $$p(k;\Delta z,\theta) = \exp[-i\pi\Delta z(\lambda k^2 - 2k_x \tan\theta_x - 2k_y \tan\theta_y)],$$

wherein, r denotes a real-space coordinate, and k denotes an reciprocal-space coordinate; $\Delta z$ represents a thickness of the object function of each slice; $\lambda$ denotes a wavelength of the electron beam, $k_x$ and $k_y$ denotes an x-axis coordinate and a y-axis coordinate of the reciprocal-space coordinate k; $\theta=(\theta_x,\theta_y)$ represents the tilt angle of the sample zone axis with respect to the electron beam direction, the tilt angle comprises a first tilt angle and a second tilt angle, $\theta_x$ represents the first tilt angle, $\theta_y$ represents the second tilt angle, and the variable parameters to be optimized comprises $\theta_x$ and $\theta_y$.

4. The method of claim 1, wherein the parameters to be optimized are optimized according to the gradients to be:

$$O'_i = O_i - \alpha_{O_i}\frac{\partial \mathcal{L}}{\partial O_i}$$

$$P' = P - \alpha_P\frac{\partial \mathcal{L}}{\partial P}$$

$$\theta'_x = \theta_x - \alpha_{\theta_x}\frac{\partial \mathcal{L}}{\partial \theta_x}$$

$$\theta'_y = \theta_y - \alpha_{\theta_y}\frac{\partial \mathcal{L}}{\partial \theta_y}$$

wherein, the tilt angle comprises a first tilt angle and a second tilt angle; $O_i$ represents the object function of an i-th slice, P represents the electron beam function, $\theta_x$ represents the first tilt angle, $\theta_y$ represents the second tilt angle; $O'_i$ represents an updated object function of the i-th lamella, P' represents an updated electron beam function, $\theta_x'$ represents an updated first tilt angle, $\theta_y'$ represents an updated second tilt angle; $\alpha_{O_i}$ represents a learning rate of the object function $O_i$ of the i-th lamella, $\alpha_P$ represents a learning rate of the electron beam function P, $\alpha_{\theta_x}$ represents a learning rate of the first tilt angle $\theta_x$, $\alpha_{\theta_y}$ represents a learning rate of the second tilt angle $\theta_y$;

$$\frac{\partial \mathcal{L}}{\partial O_i}$$

represents a gradient of the loss function with respect to the object function of the i-th lamella, $$\frac{\partial \mathcal{L}}{\partial P}$$

represents a gradient of the loss function with respect to the electron beam function, $$\frac{\partial \mathcal{L}}{\partial \theta_x}$$

a represents a gradient of the loss function with respect to the first tilt angle $\theta_x$, and $$\frac{\partial \mathcal{L}}{\partial \theta_y}$$

represents a gradient of the loss function with respect to the second tilt angle $\theta_y$.

5. The method of claim 1, wherein the termination condition for the iterations comprises:
the loss function converging; or
the number of the iterations reaching a preset iteration number threshold.

6. The method of claim 1, wherein the optimized parameters comprise an optimized first tilt angle, an optimized second tilt angle, and an optimized object function, wherein the optimized object function is a final projection potential of the sample on a zone axis.

7. An electron ptychography apparatus for automatically correcting a mistilt of a zone axis of a sample, comprising:

an acquisition module, configured to acquire a diffraction pattern of each scan point of the sample by scanning the sample through using the electron beam;

a calculation module, configured to initialize an object function and an electron beam function, and construct a forward propagation model according to a propagation function between sample slices, a variable parameter of the propagation function between the sample slices comprising a tilt angle of a zone axis of the sample relative to an electron beam direction, and configured to calculate a loss function to be a difference between a calculated diffraction pattern and the acquired diffraction pattern, the calculated diffraction pattern being obtained from the forward propagation model and parameters to be optimized;

an optimization module, configured to calculate gradients of the loss function with respect to the parameters to be optimized, respectively, and optimize the parameters to be optimized according to the gradients; and an imaging module, configured to execute the calculating the loss function of the forward propagation model, the calculating the gradients of the loss function with respect to the parameters to be optimized respectively, and the optimizing the parameters to be optimized according to the gradients, iteratively, till a termination condition for iterations is satisfied, and configured to output the optimized parameter.

8. The apparatus of claim 7, wherein the parameters to be optimized comprise the object function, the electron beam function, and the tilt angle of the zone axis of the sample relative to the electron beam direction; and the tilt angle comprises a first tilt angle and a second tilt angle.

9. The apparatus of claim 7, wherein an emergent wave function in the forward propagation model is:

$$\varphi_{ext,j} = \mathcal{P}_{\Delta z,\theta}\{\ldots \mathcal{P}_{\Delta z,\theta}\{\mathcal{P}_{\Delta z,\theta}\{P(r-r_j)O_1(r)\} O_2(r)\}O_3(r)\ldots\}O_N(r),$$

wherein, $P(r-r_j)$ represents the electron beam scanning a j-th position; $O_i$ represents the object function of an i-th lamella; $\mathcal{P}_{\Delta z,\theta}\{\cdot\}$ represents a Fresnel near-field diffraction action factor, and the action factor is:

$$\mathcal{P}_{\Delta z,\theta}\{\cdot\} = \mathcal{F}^{-1}\{\mathcal{F}\{\cdot\}p(k;\Delta z,\theta)\}$$

wherein, $$p(k;\Delta z,\theta) = \exp[-i\pi\Delta z(\lambda k^2 - 2k_x \tan\theta_x - 2k_y \tan\theta_y)],$$

wherein, r denotes a real-space coordinate, and k denotes an reciprocal-space coordinate; $\Delta z$ represents a thickness of the object function of each lamella; $\lambda$ denotes a wavelength of the electron beam, $k_x$ and $k_y$ denotes an x-axis coordinate and a y-axis coordinate of the reciprocal-space coordinate k; $\theta=(\theta_x,\theta y)$ represents the tilt angle of the sample zone axis with respect to the electron beam direction, the tilt angle comprises a first tilt angle and a second tilt angle, $\theta_x$ represents the first tilt angle, $\theta_y$ represents the second tilt angle, and the variable parameters to be optimized comprises $\theta_x$ and $\theta_y$.

10. The apparatus of claim 7, wherein the parameters to be optimized are optimized according to the gradients to be:

$$O'_i = O_i - \alpha_{O_i}\frac{\partial \mathcal{L}}{\partial O_i}$$

$$P' = P - \alpha_P \frac{\partial \mathcal{L}}{\partial P}$$

$$\theta'_x = \theta_x - \alpha_{\theta_x}\frac{\partial \mathcal{L}}{\partial \theta_x}$$

$$\theta'_y = \theta_y - \alpha_{\theta_y}\frac{\partial \mathcal{L}}{\partial \theta_y}$$

wherein, the tilt angle comprises a first tilt angle and a second tilt angle; $O_i$ represents the object function of an i-th lamella, P represents the electron beam function, $\theta_x$ represents the first tilt angle, $\theta_y$ represents the second tilt angle; $O'_i$ represents an updated object function of the i-th lamella, P' represents an updated electron beam function, $\theta_x'$ represents an updated first tilt angle, $\theta_y'$ represents an updated second tilt angle; $\alpha_{O_i}$ represents a learning rate of the object function $O_i$ of the i-th lamella, $\alpha_P$ represents a learning rate of the electron beam function P, $\alpha_{\theta_x}$ represents a learning rate of the first tilt angle $\theta_x$, $\alpha_{\theta_y}$ represents a learning rate of the second tilt angle $\theta_y$;

$$\frac{\partial \mathcal{L}}{\partial O_i}$$

represents a gradient of the loss function with respect to the object function of the i-th lamella, $$\frac{\partial \mathcal{L}}{\partial P}$$

represents a gradient of the loss function with respect to the electron beam function, $$\frac{\partial \mathcal{L}}{\partial \theta_x}$$

represents a gradient of the loss function with respect to the first tilt angle $\theta_x$, and $$\frac{\partial \mathcal{L}}{\partial \theta_y}$$

represents a gradient of the loss function with respect to the second tilt angle $\theta_y$.

11. The apparatus of claim 7, wherein the termination condition for the iterations comprises:

the loss function converging; or the number of the iterations reaching a preset iteration number threshold.

12. A computer device, comprising a memory and a processor, wherein the memory has a computer program stored thereon, and the processor, when executing the computer program, performs steps of the method of claim 1.

13. A non-transitory computer readable storage medium, having a computer program stored thereon, wherein the computer program, when executed by a processor, causes the processor to perform steps of the method of claim 1.

* * * * *